United States Patent
Henning (10) Patent No.: US 7,172,252 B2
(45) Date of Patent: Feb. 6, 2007

(54) MOTOR VEHICLE REAR SEAT (75) Inventor: Werner Ingmar Henning, Illingen (DE)

(73) Assignee: Intier Automotive Seating Systems GmbH, Ludwigsfelde (DE)

( * ) Notice: Subject to any disclaimer, the term of this patent is extended or adjusted under 35 U.S.C. 154(b) by 0 days.

(21) Appl. No.: 10/490,498

(22) PCT Filed: Sep. 18, 2002

(86) PCT No.: PCT/EP02/10454

§ 371 (c)(1),
(2), (4) Date: Oct. 18, 2004

(87) PCT Pub. No.: WO03/026919

PCT Pub. Date: Apr. 3, 2003

(65) Prior Publication Data

US 2005/0040689 A1 Feb. 24, 2005

(30) Foreign Application Priority Data

Sep. 21, 2001 (DE) .............................. 101 46 711

(51) Int. Cl.
B60N 2/00 (2006.01)

(52) U.S. Cl. ............................. 297/354.13; 297/354.1; 297/353

(58) Field of Classification Search ........... 297/344.21, 297/378.1, 354.13, 362.11, 353, 354.1; 248/131, 248/416; 296/65.13, 66, 69.05
See application file for complete search history.

(56) References Cited

U.S. PATENT DOCUMENTS 2,694,814 A * 11/1954 Doner ............................. 5/47
3,171,682 A * 3/1965 Buser et al. ................... 296/66
3,986,218 A * 10/1976 Mizelle ............................. 5/43
4,620,335 A * 11/1986 Dodgen ........................... 5/118
5,718,479 A * 2/1998 Rautenbach ........... 297/354.13
5,722,101 A * 3/1998 Grigoriev ...................... 5/37.1
6,196,613 B1 * 3/2001 Arai ......................... 296/65.13
6,464,297 B2 * 10/2002 Garrido et al. ........ 297/354.13
6,540,295 B1 * 4/2003 Saberan et al. ........ 297/344.21
2002/0067056 A1 6/2002 Andrigo et al.

FOREIGN PATENT DOCUMENTS

DE 198 37 051 A 3/2000

* cited by examiner

Primary Examiner—Peter M. Cuomo
Assistant Examiner—Erika Garrett
(74) Attorney, Agent, or Firm—Clark Hill PLC (57) ABSTRACT The present invention relates to a motor vehicle rear seat with a seat part (2), having an upper side (4), and a seat back (6), having a rear side (12), which faces a clearance behind said motor vehicle rear seat. Said seat back (6) has at least one seat back section (8). According to the invention, said seat back section (8) is designed, such that it can be pivoted from a normal position to a first position, in which the rear side (12) of the seat back section (8) is oriented upwards and, with the upwards-oriented rear side (12), to a second position in the clearance behind the motor vehicle rear seat, such that the upper side (4) of the seat part (2) and the rear side (12) of the seat back section (8) form a loading area. Preferably, a loading plate (18), hinged on said seat back section (8), can be pivoted onto the upper side (4) of the seat part (2) in the second position of the seat back section (8).

4 Claims, 7 Drawing Sheets

MOTOR VEHICLE REAR SEAT

BACKGROUND OF THE INVENTION

1. Field of the Invention

The present invention relates to a motor vehicle rear seat pivotal between a first normal position for supporting an occupant in the seat and a second flat position for providing a loading area.

2. Description of the Related Art

Motor vehicle rear seats which offer the option of providing an additional loading area adjoining the luggage compartment situated behind them are known from the prior art. They are used primarily in minibuses, vans, etc., but also in basic passenger vehicles. So that the additionally provided loading area is situated essentially level with the luggage compartment floor, it is necessary for the seat to be constructed to be as flat as possible in its loading position. The upholstered seat part of the rear seat causes problems in this regard, since it is in the way of the backrest when the latter is folded forward.

To solve this problem, rear seats have been developed, in which, before the backrest is folded forward, the seat part can be removed from the folding region. Constructions of this type are described, for example, in the publications DE 43 40 446 C2 and U.S. Pat. No. 5,730,496. In the above-mentioned rear seats, there is generally the problem that the separate seat parts, after being removed, have to be accommodated loosely somewhere else.

Further known rear seat constructions make provision for the entire rear seat to be pivoted forward about a transverse axis arranged on the vehicle floor in the front region of the seat part, thus producing an additional loading area where the rear seat previously was arranged. A construction of this type is disclosed, for example, in DE 28 49 985 A1 and DE 44 22 920 A1. The disadvantage of this construction resides essentially in the fact that although the loading area is enlarged by the pivoting, a very large free space is in turn lost somewhere else, namely at the location into which the entire rear seat has been pivoted.

The prior art furthermore discloses solutions, in which the seat part can be lowered in order then to fold the backrest onto the lowered seat part. In some constructions, provision is furthermore made to combine the lowering movement of the seat part with the folding movement of the backrest in order to simplify operation. Constructions of the above-mentioned type are disclosed, for example, by the publications DE 199 57 380 and DE 199 04 009.

The motor vehicle rear seats known from the prior art have the disadvantage that they require a complicated construction, can be difficult to operate and incur high production costs.

The object of the present invention is therefore to provide a motor vehicle rear seat which is of simple construction and therefore incurs low production costs, with the handling being made easier.

SUMMARY OF THE INVENTION

The motor vehicle rear seat according to the invention has a seat part and a backrest. The seat part has an upper side, the upper side being understood to mean the upwardly oriented surface on which the passenger sits. The backrest has a front side, against which the passenger leans, and a rear side, the rear side facing a free space, normally the luggage compartment space, behind the motor vehicle rear seat. The backrest has at least one backrest section. The backrest can therefore be divided into a number of parts, i.e. at least two parts, in the longitudinal direction. If the discussion is of at least one backrest section below, this may also be understood to mean the entire backrest if the backrest is a single component.

According to the invention, at least one backrest section is designed in such a manner that it can be pivoted from a normal position into a first position, in which the rear side of the backrest section is oriented upward. Furthermore, this backrest section can be pivoted, with the rear side oriented upward, into a second position in the free space behind the motor vehicle seat, so that the upper side of the seat part and the rear side of the backrest section form a loading area.

One substantial advantage of the motor vehicle rear seat according to the invention is that the seat part does not have to be moved at the same time in order to produce the loading area. This means that the seat part does not have to be removed, pivoted or lowered, which results in a simpler construction which can be operated in a simple manner and can be produced cost-effectively. In addition, a further advantage resides in the fact that the items to be transported are deposited on the rear side of the backrest section and not on the front side thereof, as is the case in rear seats in which the backrest is simply pivoted back.

In one preferred embodiment of the motor vehicle rear seat according to the invention, a loading panel is arranged pivotably on the rear side of the backrest section. If the backrest section is pivoted into the second position, the loading panel can be pivoted onto the upper side of the seat part. This is advantageous, since the upper side of the seat part is protected by the loading panel from the items to be transported. Soiling or damaging the seat part is thus avoided.

In a particularly preferred embodiment of the motor vehicle rear seat according to the invention, the backrest section has a rear wall and an arm rest. In the normal position of the backrest section, the arm rest can be pivoted onto the upper side of the seat part while the rear wall can be pivoted into the free space behind the motor vehicle rear seat. This produces a hatch between the free space or luggage compartment and the passenger compartment. Bulky objects, for example skis, can be transported in this manner, with, at the same time, the possibility of sitting on the motor vehicle rear seat remaining. In addition, it is also possible for just the arm rest to be pivoted onto the seat part while the rear wall remains in an upright position and closes the hatch, if only the function of the arm rest is to be used. In this case, the passenger is protected by the rear wall from the objects stored in the free space or luggage compartment.

In a further preferred embodiment of the present invention, the backrest section can furthermore be pivoted from the normal position into a third position. In this position, the upper side of the seat part and the front side of the backrest section form a reclining surface, so that a place to sleep is produced.

In one preferred embodiment, the motor vehicle seat according to the invention has a pivoting device which, on the one hand, is fastened to the vehicle floor forming a first pivot axis about which the backrest section can be pivoted into the second and third position and, on the other hand, is connected to the backrest section forming a second pivot axis about which the backrest section can be pivoted into the first position.

In an advantageous manner, in a further preferred embodiment of the motor vehicle seat, locking means are respectively provided to prevent the pivoting about the first and second pivot axis. This enables the backrest section to be largely locked in the particular positions.

In a particularly preferred embodiment of the motor vehicle seat according to the invention, the pivoting device and the backrest section interact in such a manner that the backrest section, when being pivoted from the first position into the second position, can be pivoted merely in one direction of rotation about the second pivot axis from its orientation with the rear side oriented upward. This makes it possible for the operator to pivot the backrest section in a simple manner from the first position into the second position.

The pivoting device of the motor vehicle seat according to the invention preferably has a first limb, which is fastened to the vehicle floor, a second parallel limb, which is connected in an articulated manner to the backrest section, and a third and fourth limb, which are arranged parallel to each other and are connected in each case firstly to the first limb and secondly to the second limb. Such a design of the pivoting device ensures, inter alia, a particularly lightweight construction.

In a particularly preferred embodiment of the motor vehicle seat according to the invention, the second limb has a stop element which is guided in a guide, which is arranged about the second pivot axis, in the backrest section. The stop element and the guide interact in such a manner that the backrest section can be pivoted only in one direction of rotation about the second pivot axis in its orientation with the rear seat oriented upward. In addition to the lightweight construction of the pivoting device, the simple pivoting of the backrest section from the first position into the second position is therefore ensured.

In a further preferred embodiment of the motor vehicle seat according to the invention, the stop element and the guide interact in such a manner that the backrest section, in the normal position, can be pivoted merely in one direction of rotation about the second pivot axis from its orientation. This means that a further stop element does not need to be provided in order to end the movement of the backrest section after it has been pivoted back from the first position into the normal position.

BRIEF DESCRIPTION OF THE DRAWINGS

The invention is explained in greater detail below using exemplary embodiments with reference to the attached figures, in which.

DETAILED DESCRIPTION OF THE PREFERRED EMBODIMENT

Figures 1, 2:
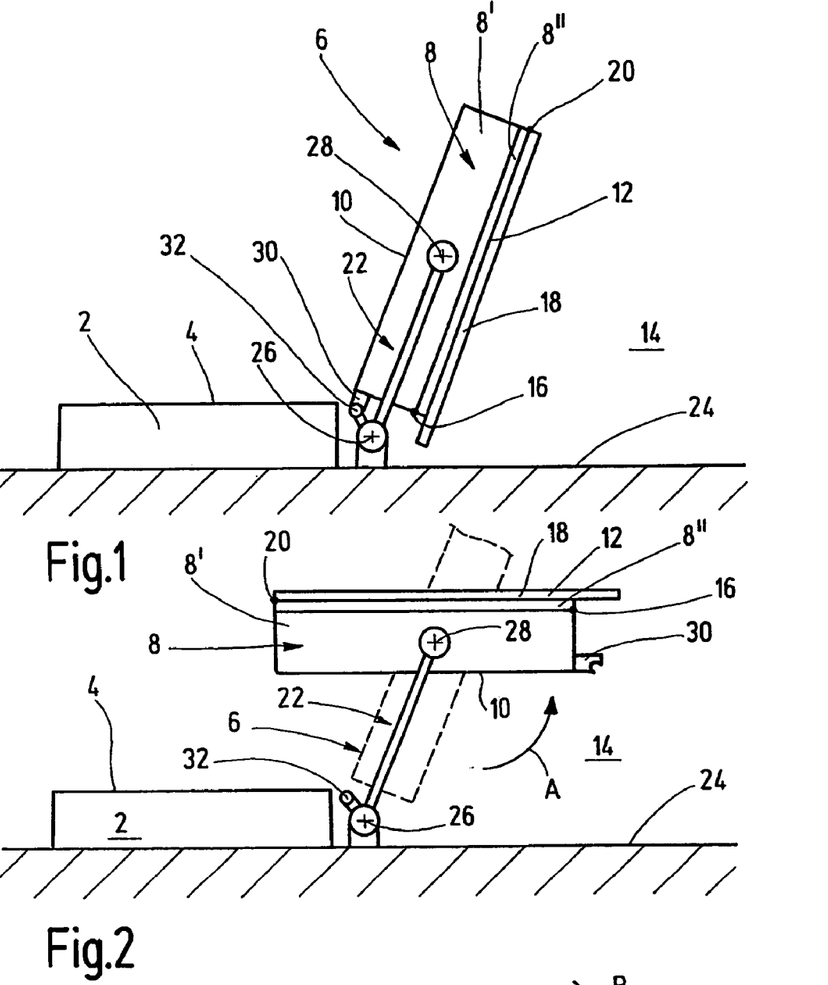
FIG. 1 shows a diagrammatic side view of the motor vehicle rear seat according to the invention with the backrest section in the normal position.
FIG. 2 shows the motor vehicle rear seat of FIG. 1 with the backrest section in the first position.

FIG. 1 shows a side view of the motor vehicle rear seat according to the invention in a diagrammatic illustration. The motor vehicle rear seat has a seat part 2, which is fastened in the motor vehicle and has an upwardly oriented upper side 4 on which a passenger (not illustrated) can sit. Furthermore, a backrest 6 is provided which has at least one backrest section 8, which is shown in FIG. 1 in the normal position, in which the seated passenger can lean against the backrest 6, which is oriented at an angle to the seat part 4. The backrest 6 has a front side 10, which faces the passenger, and a rear side 12, which faces a free space 14 behind the motor vehicle rear seat.

The backrest section 8 is of sandwich-like construction, i.e. it is composed of upholstery 8' on the front side and a rear wall 8" on the rear side. The rear wall 8" is connected pivotably to the backrest section 8 via a lower, first joint 16 and extends over the entire height of the backrest section 8. On the rear side 12 of the backrest section 8 and therefore on the rear wall 8", a loading panel 18 is connected pivotably to the backrest section 8 via an upper, second joint 20. The loading panel 18 is designed to be longer than the rear wall 8", with the result that it protrudes downward. Both the rear wall 8" and the loading panel 18 are fastened releasably in their position (illustrated in FIG. 1) relative to the backrest section 8, the illustration of the fastening means having been omitted for reasons concerned with clarity.

A pivoting of the backrest section 8 is made possible by a pivoting device 22 which, on the one hand, is fastened to the vehicle floor 24 forming a first pivot axis 26 and, on the other hand, is connected laterally to the backrest section 8 forming a second pivot axis 28. In order to prevent the backrest section 8 from being pivoted out of the normal position, a first locking means 30 is provided, which is arranged on the backrest section 8 and is connected releasably to a mating element 32 on the pivoting device 22, so that a pivoting about the second pivot axis 28 is prevented, and a second releasable locking means (not illustrated in FIG. 1) is provided, which is arranged on the pivoting device 22 and prevents a pivoting about the first pivot axis 26.

The procedure for providing a loading area is described below with reference to FIGS. 1 to 4. First of all, the locking means 30 is released from the mating element 32, as a result of which a pivoting of the backrest section 8 in the direction of the arrow A (FIG. 2) is possible. The pivoting from the normal position in another direction of rotation is prevented by the particular design of the pivoting device 22 and backrest section 8 in the region of the second pivot axis 28. The pivoting in the direction of the arrow A is carried out as far as an orientation of the backrest section 8, in which the rear side 12 of the backrest section 8 is oriented upward and the backrest section 8 is arranged essentially parallel to the seat part 2 and the vehicle floor 14. In this first position, which is illustrated in FIG. 2, the backrest section 8 cannot be pivoted further in the direction of the arrow A, which can likewise be attributed to the particular design of the pivoting device 22 and backrest section 8 in the region of the second pivot axis 28.

Figure 3:
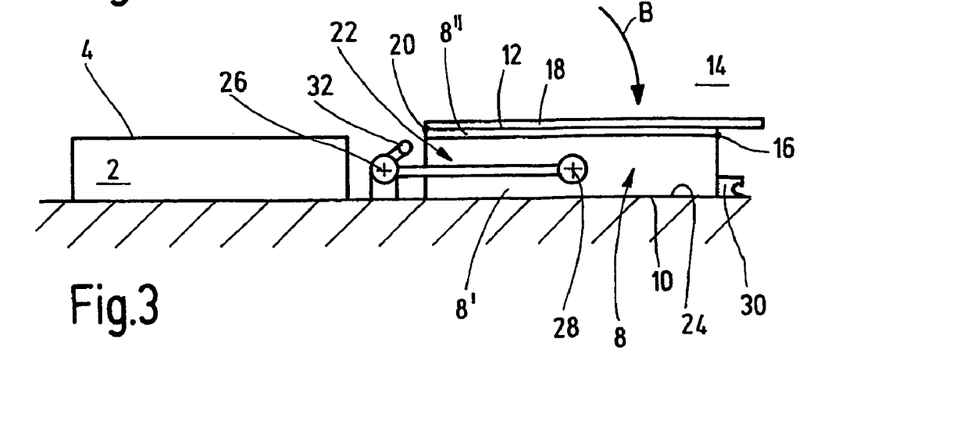
FIG. 3 shows the motor vehicle rear seat of FIGS. 1 and 2 with the backrest section in the second position.

If the backrest section 8 has reached the first position, which is illustrated in FIG. 2, the second locking means (not illustrated) is released, so that the backrest section 8 can be pivoted about the first pivot axis 26. In order to pivot the backrest section 8 in the direction of the arrow B (FIG. 3), the operator has to press the backrest section 8 downward in the direction of the vehicle floor 14. In this case, the operator has merely to exert pressure on the rear side of the backrest section 8, it being possible for this to take place without any problem in the region in which the second joint 20 is arranged, since, on account of the design of the pivoting device 22 and backrest section 8, the backrest section 8 can be pivoted only in one direction of rotation about the second pivot axis 28 from its orientation with the rear side 12 oriented upward. In this manner, the backrest section 8 is pivoted downward, with the orientation remaining the same, into the second position, which is illustrated in FIG. 3.

Figure 4:
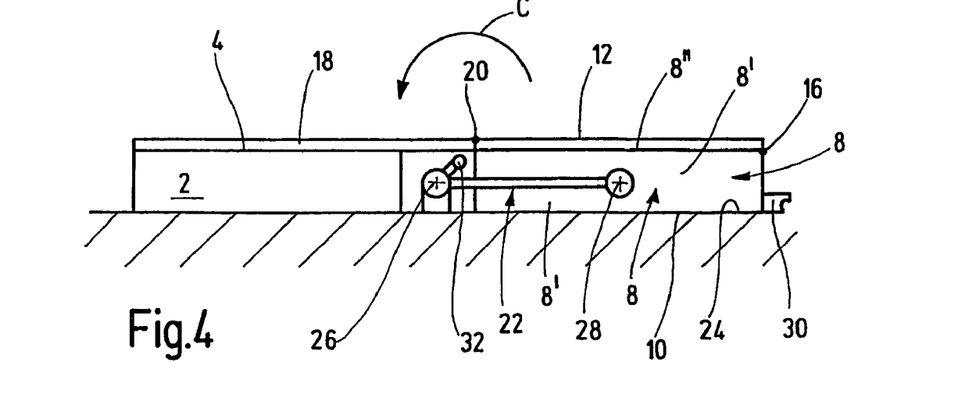
FIG. 4 shows the motor vehicle rear seat of FIGS. 1, 2 and 3 with pivoted loading panel.

A loading area is already formed in the second position. In order, however, to protect the upper side 4 of the seat part 2 from the items to be transported (not illustrated), the loading panel 18 is pivoted about the second joint 20 onto the upper side 4 of the seat part 2, as is illustrated in FIG. 4 with reference to the arrow C. In order ultimately to pass back into the position illustrated in FIG. 1, the above-mentioned steps are carried out in the reverse sequence.

Figure 5:
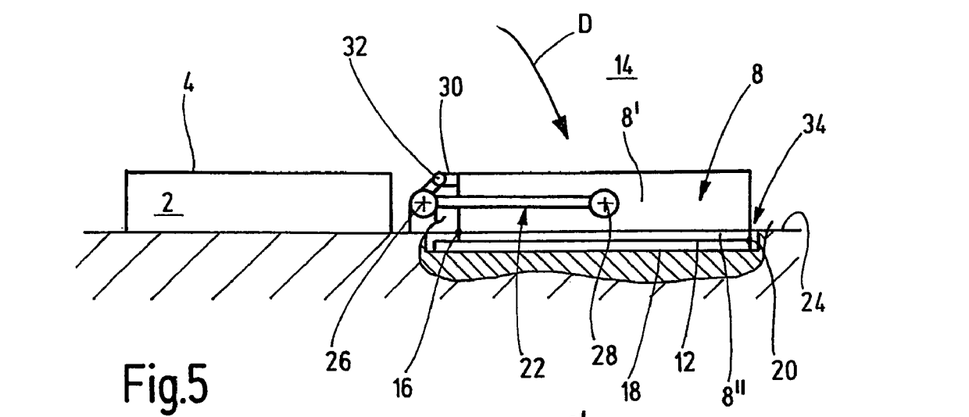
FIG. 5 shows the motor vehicle rear seat of FIG. 1 with the backrest section in the third position.

The motor vehicle seat from FIGS. 1 to 4 is illustrated in FIG. 5 with one preferred feature. In order also to provide a reclining surface, such as, for example, a place to sleep, the operator can release the second locking means (not illustrated), so that the backrest section 8 can be pivoted about the first pivot axis 26 in the direction of the arrow D. The pivoting causes the backrest section to pass into a third position, in which the rear side 12 of the backrest section 8 is oriented downward and the upper side 4 of the seat part 2 and the front side 10 of the backrest section 8 are arranged essentially in one plane, with the reclining surface being formed. In order for the upper side 4 and front side 10 to be arranged as far as possible in one plane, a depression 34 is advantageously provided in the vehicle floor, it being possible to produce said depression, for example, by removal of an insert panel (not illustrated) in the vehicle floor 24, so that the rear wall 8" and the loading panel 18 can be accommodated in the depression 34 in the third position of the backrest section.

Figure 6:
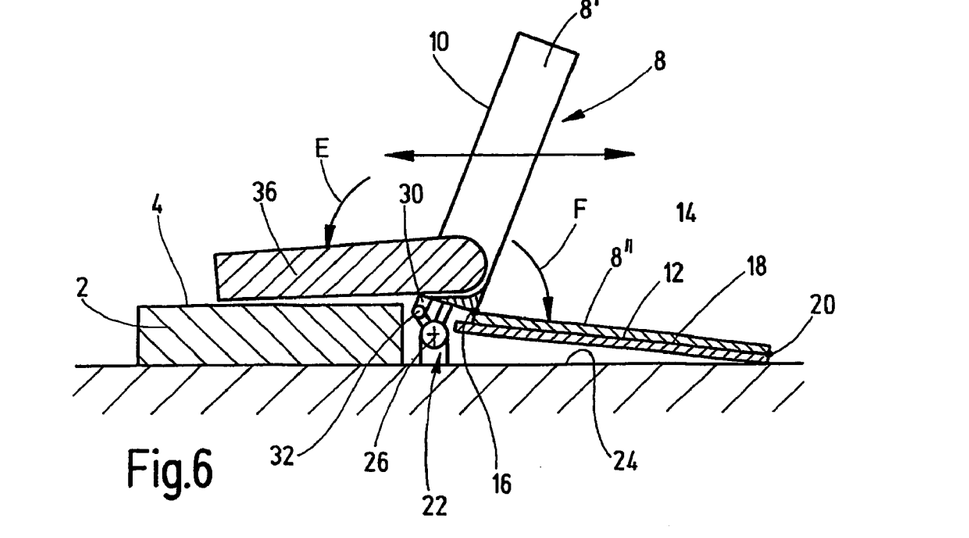
FIG. 6 shows the motor vehicle rear seat of FIG. 1 with pivoted arm rest and pivoted rear wall.

The motor vehicle rear seat from FIGS. 1 to 5 is illustrated in FIG. 6 with a further preferred feature. In addition to the rear wall 8", the backrest section 8 has an arm rest 36 which, in the normal position of the backrest section 8, can be folded onto the upper side 4 of the seat part 2, as can be seen with reference to the arrow E. In this position, the passenger has the possibility of supporting his arm on the arm rest 36. In addition, the rear wall 8" can be pivoted about the joint 16 into the free space 14 on the vehicle floor 24, as indicated with reference to the arrow F. This produces a hatch for long stretched-out items to be transported, for example skis, with a possibility for passengers to sit on the motor vehicle rear seat continuing to remain.

FIGS. 7 to 11 illustrate individual components of the previously described motor vehicle rear seat in detail, with the components which are shown being embodied in an advantageous manner but nevertheless intended to be understood as exemplary, i.e. not limiting.

Figure 7:
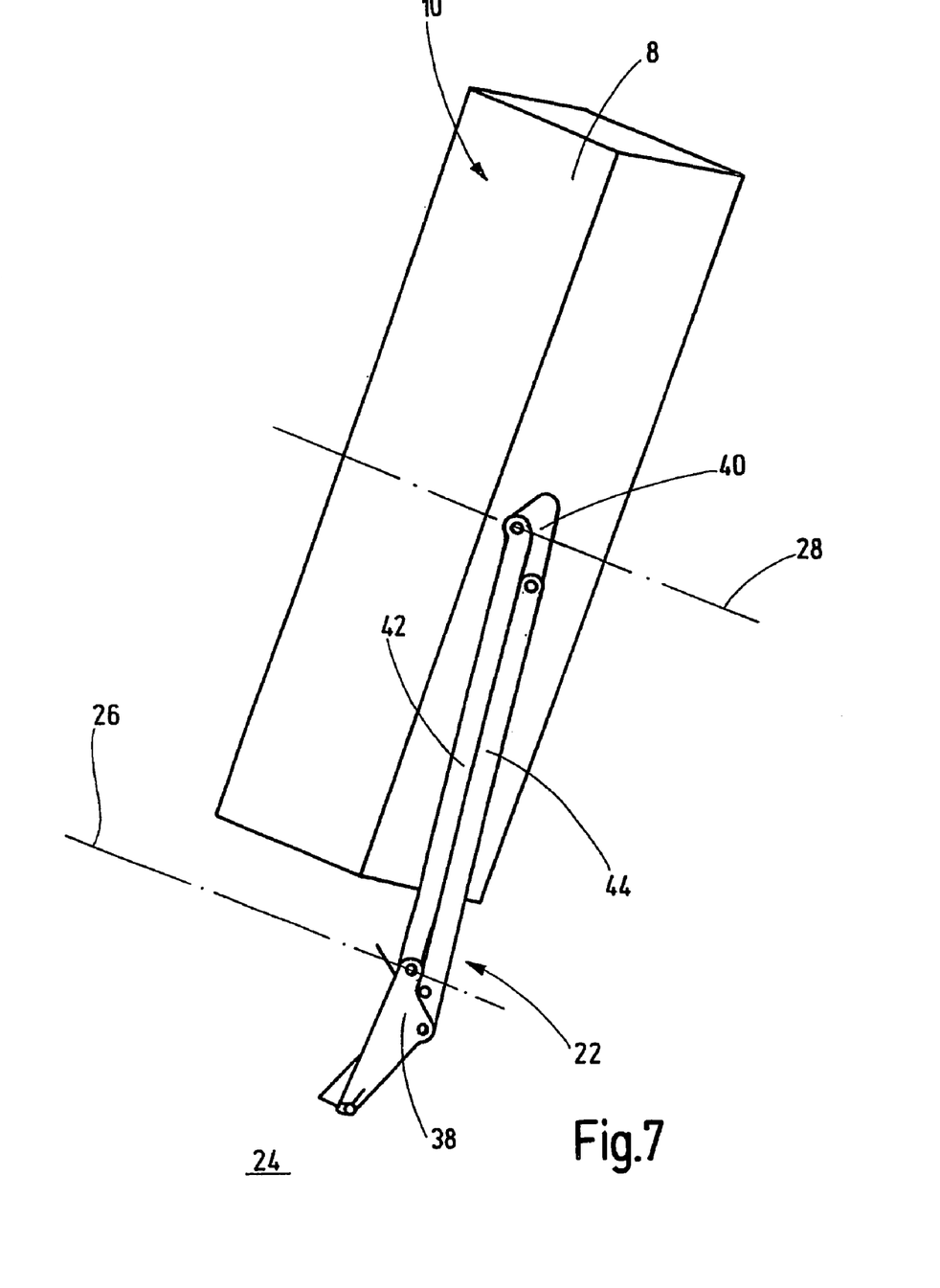
FIG. 7 shows a detailed, perspective illustration of the pivoting device and of the backrest section of FIG. 1.

FIG. 7 illustrates the pivoting device 22 and the backrest section 8 in the normal position, the backrest section 8 being indicated merely schematically. The pivoting device 22 has a first limb 38, which is fastened to the vehicle floor 24, and a second parallel limb 40, which is connected in an articulated manner to the backrest section 8 in order to form the second pivot axis 28. Furthermore provided are a third limb 42 and a fourth limb 44 which are arranged parallel to each other, are identical in length and are connected in an articulated manner in each case firstly to the first limb 38 and secondly to the second limb 40. The four limbs 38, 40, 42, 44 therefore form a parallelogram which has opposite limbs 38, 40 and 42, 44 of identical length. The connecting point between the first and third limbs 38, 42 may be regarded as the first pivot axis 26. A pivoting device 22 of this type is also referred to as a "pantograph".

Figure 10:
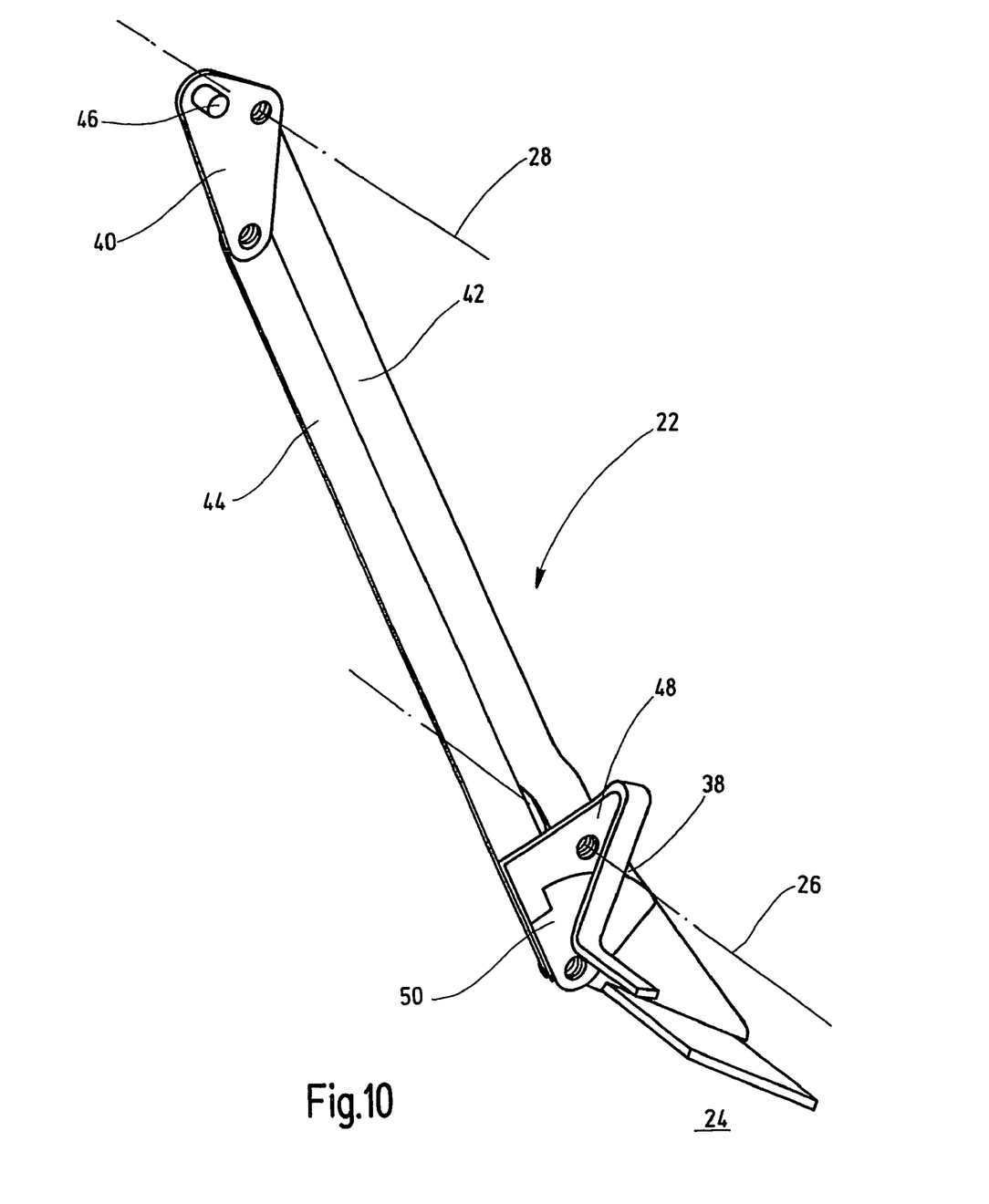
FIG. 10 shows a detailed, perspective illustration of the pivoting device in the position in FIG. 7.

FIG. 10 shows the pivoting device from FIG. 7 on its own and from a different perspective. It can be seen in this perspective that the second limb 40 has a stop element 46 which faces the backrest section 8 and is guided in the backrest section 8 in a guide which is described in greater detail with reference to FIG. 8. FIG. 10 furthermore illustrates the second locking means 48 which was omitted in the illustrations of FIGS. 1 to 5. The second locking means 48 is designed as a pivotable hook which, in the closed position (illustrated in FIGS. 7 and 10), engages behind a second mating element 50, which is arranged fixed on the fourth limb 44, and therefore prevents a pivoting of the backrest section 8 about the first pivot axis 26.

Figure 8:
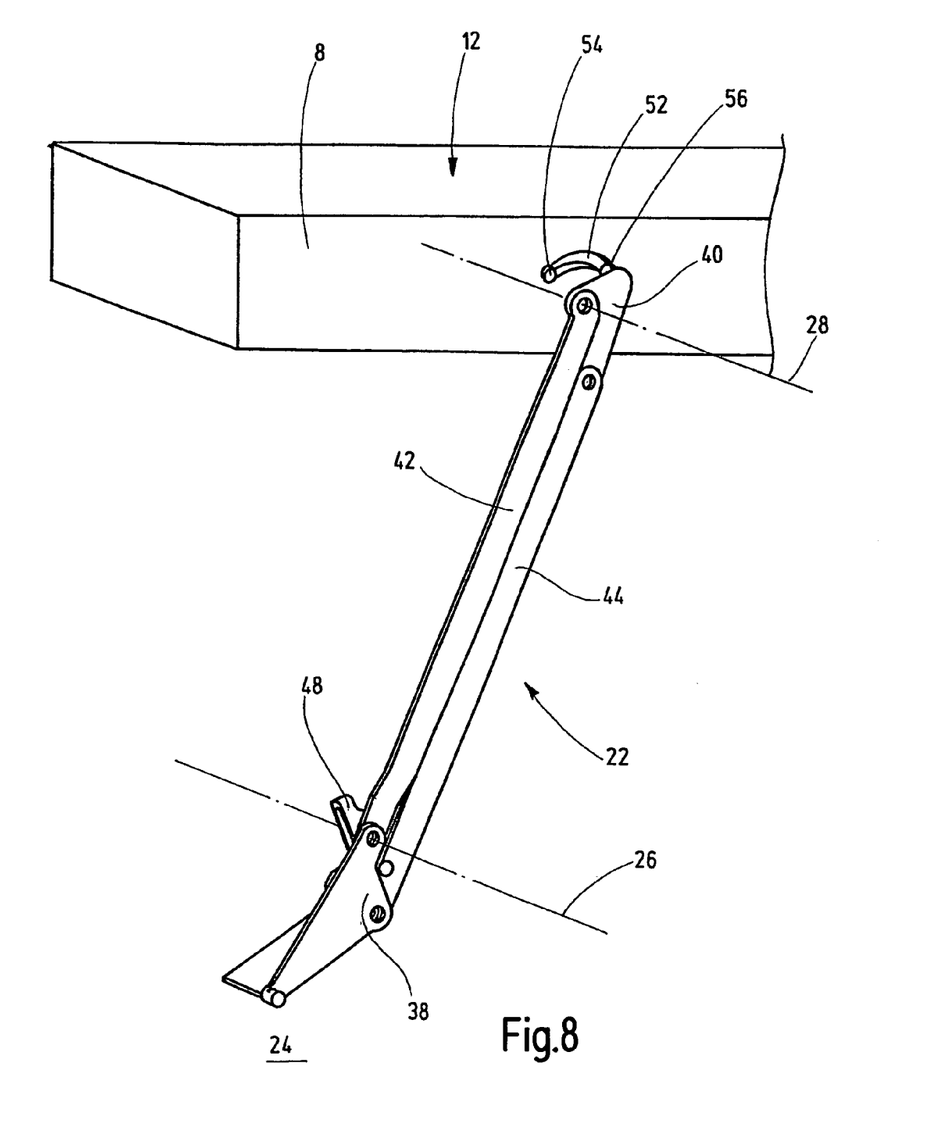
FIG. 8 shows a detailed, perspective illustration of the pivoting device and of the backrest section of FIG. 2.

In FIG. 8, the pivoting device 22 and backrest section 8 from FIG. 7 are illustrated in the first position of the backrest section 8. The locking means 48 has not been released, and so the backrest section 8 has pivoted only about the second pivot axis 28. The guide 52, which is provided in the backrest section 8 and into which the stop element 46 (FIG. 10) projects, can also be seen in FIG. 8. The guide 52 is designed as a long stretched-out depression which surrounds the second pivot axis 28 in the shape of a circular arc. The stop element 46 has been guided from a first stop position 54, which is illustrated by broken lines in FIG. 8, into a second stop position 56 by the backrest section 8 pivoting from the normal position into the first position. In the first position of the backrest section 8, the backrest section 8 can therefore only still be pivoted in one direction of rotation about the second pivot axis 28.

Figure 9:
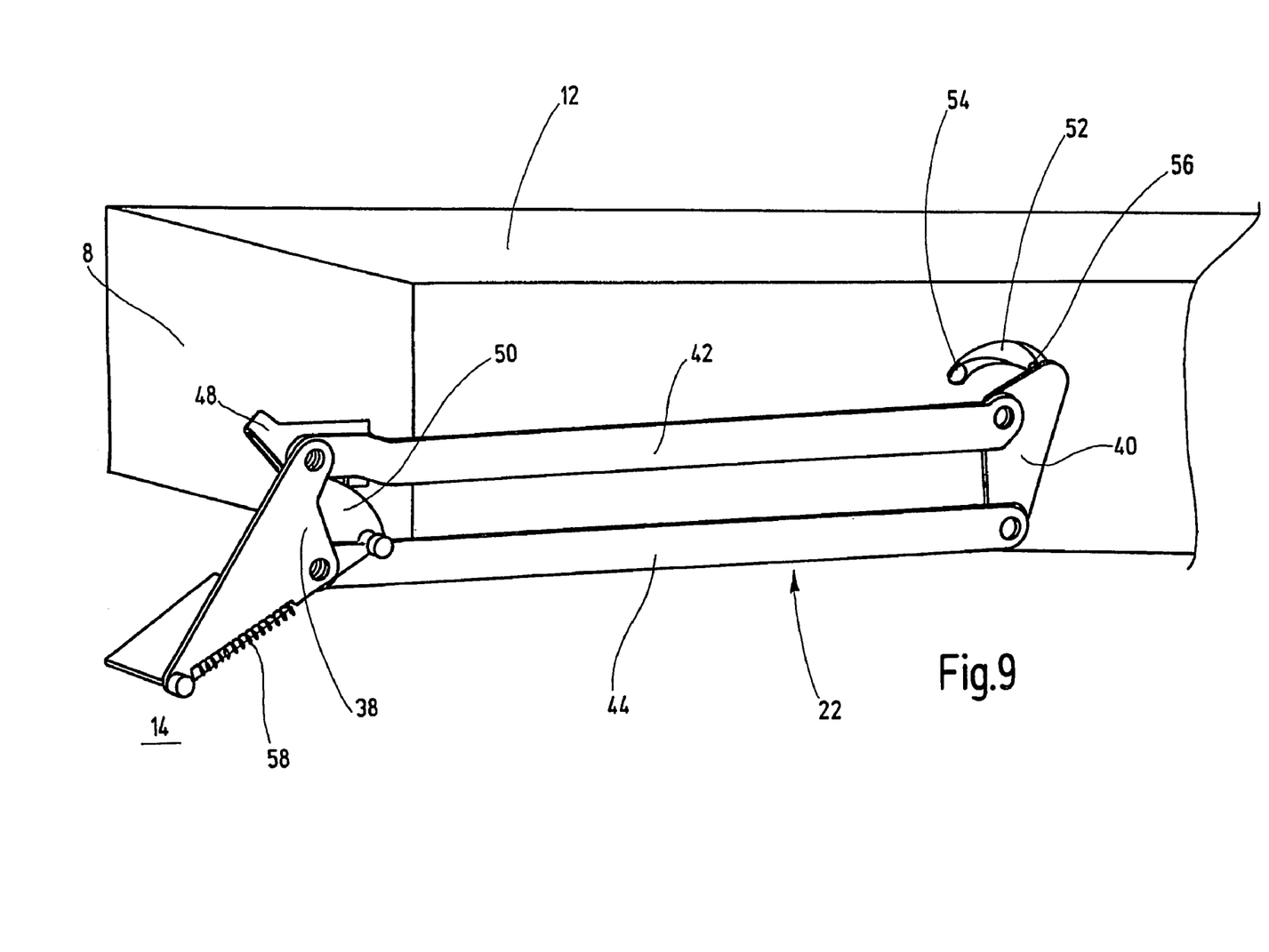
FIG. 9 shows a detailed, perspective illustration of the pivoting device and of the backrest section of FIG. 3.
Figure 11:
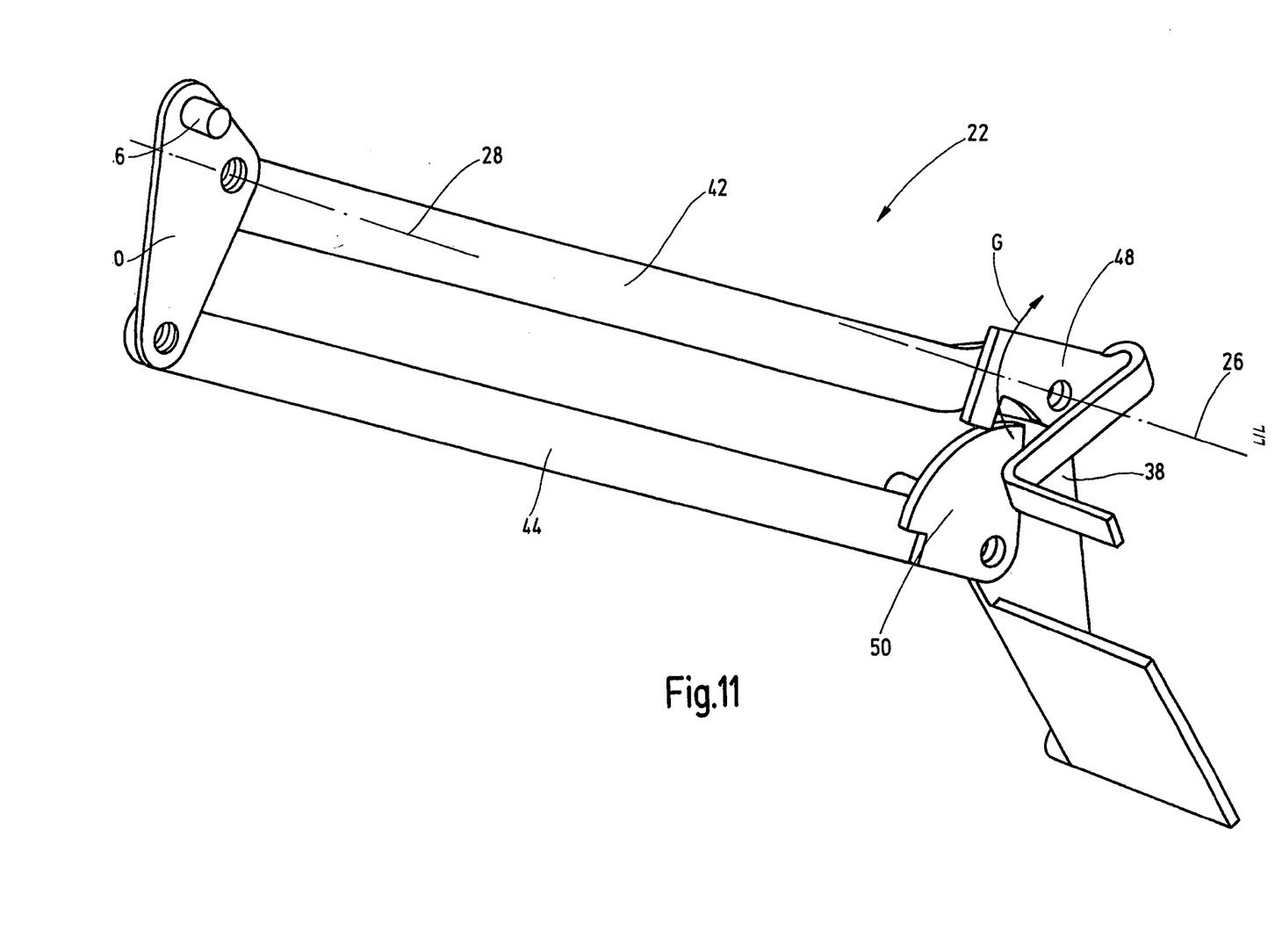
FIG. 11 shows a detailed, perspective illustration of the pivoting device in the position in FIG. 9.

In order to pivot the backrest section 8 into the second position, which is illustrated in FIG. 9, the second locking means 48 has to be released from the second mating element 50, as illustrated in FIG. 11 with reference to the arrow G. The backrest section 8 is then pressed down, i.e. is pivoted about the first pivot axis 26. Owing to the parallelogram-like design of the pivoting device 22, the second limb 40 remains in a parallel orientation with respect to the first limb 38, so that the stop element 46 remains in the second stop position 56. This makes the pivoting of the backrest 8 in a parallel orientation with respect to the vehicle floor 14 easier, since the backrest section 8 can be pivoted only in one direction of rotation about the second pivot axis 28 from its orientation with the rear side 12 oriented upward. The backrest section 8 therefore passes into the second position, which is illustrated in FIG. 9, as a result of which a loading area is provided.

As illustrated in FIG. 9, the fourth limb 44 of the pivoting device 22 is prestressed resiliently toward the vehicle floor 14 by means of a spring element 58, the spring element 58 in the present embodiment being formed by a tension spring which extends between the first limb 38 and the fourth limb 44.

The invention claimed is:

1. A motor vehicle rear seat with a seat part (2), which has an upper side (4), and a backrest (6), which has a front side (10) and a rear side (12) which faces a free space behind the motor vehicle rear seat, the backrest (6) having at least one backrest section (8), characterized in that the backrest section (8) is designed in such a manner that it can be pivoted from a normal position into a first position, in which the rear side (12) of the backrest section (8) is oriented upward, and, furthermore, can be pivoted, with the rear side (12) oriented upward, into a second position in the free space behind the motor vehicle seat, so that the upper side (4) of the seat part (2) and the rear side (12) of the backrest section (8) form a loading area, and can furthermore be pivoted from the normal position into a third position, in which the upper side (4) of the seat part (2) and the front side (10) of the backrest section (8) form a reclining surface and wherein said rear seat further includes a loading panel (18) pivotally connected to the rear side (12) of the backrest section for pivotal movement from a folded position against the rear side (12) of the backrest section to a covering position against the upper side (4) of the seat part (2) when the backrest section (8) is in the second position forming a loading area; the backrest section (8) having a rear wall (8") and an arm rest (36), it being possible, in the normal position of the backrest section (8), for the arm rest (36) to be pivoted onto the upper side (4) of the seat part (2) and for the rear wall (8") to be pivoted into the free space; said rear seat further including a pivoting device (22) which, on the one hand, is fastened to the vehicle floor forming a first pivot axis (26) about which the backrest section (8) can be pivoted into the second and third position, and on the other hand, is connected to the backrest section (8) forming a second pivot axis (28) about which the backrest section (8) can be pivoted into the first position, the pivoting device (22) and the backrest section (8) interact in such a manner that the backrest section (8), when being pivoted from the first into the second position, can be pivoted merely in one direction of rotation about the second pivot axis (28) from its orientation with the rear side (12) oriented upward; locking means (30; 48) to prevent the pivoting about the first and second pivot axis (26; 28); and the pivoting device (22) has a first limb (38), which is fastened to the vehicle floor, a second parallel limb (40), which is connected in an articulated manner to the backrest section (8), and a third and fourth limb (42; 44) which are arranged parallel to each other and are connected in each case firstly to the first limb (38) and secondly to the second limb (40).

2. The motor vehicle seat as claimed in claim 1, characterized in that the second limb (40) has a stop element (46) which is guided in a guide (52), which is arranged about the second pivot axis (28), in the backrest section, the stop element (46) and the guide (52) interacting in such a manner that the backrest section (8) can be pivoted only in one direction of rotation about the second pivot axis (28) in its orientation with the rear side (12) oriented upward.

3. The motor vehicle seat as claimed in claim 2, characterized in that the stop element (46) and the guide (52) interact in such a manner that the backrest section (8), in the normal position, can be pivoted only in one direction of rotation about the second pivot axis (28) from its orientation.

4. A motor vehicle rear seat with a seat part (2), which has an upper side (4), and a backrest (6), which has a front side (10) and a rear side (12) which faces a free space behind the motor vehicle rear seat, the backrest (6) having at least one backrest section (8), characterized in that the backrest section (8) is designed in such a manner that it can be pivoted from a normal position into a first position, in which the rear side (12) of the backrest section (8) is oriented upward, and, furthermore, can be pivoted, with the rear side (12) oriented upward, into a second position in the free space behind the motor vehicle seat, so that the upper side (4) of the seat part (2) and the rear side (12) of the backrest section (8) form a loading area; the backrest section (8) can furthermore be pivoted from the normal position into a third position, in which the upper side (4) of the seat part (2) and the front side (10) of the backrest section (8) form a reclining surface, the rear seat having a pivoting device (22) which, on the one hand, is fastened to the vehicle floor forming a first pivot axis (26) about which the backrest section (8) can be pivoted into the second and third position, and on the other had, is connected to the backrest section (8) forming a second pivot axis (28) about which the backrest section (8) can be pivoted into the first position, the pivoting device (22) having a first limb (38), which is fastened to the vehicle floor, a second parallel limb (40), which is connected in an articulated manner to the backrest section (8), and a third and fourth limb (42; 44) which are arranged parallel to each other and are connected in each case firstly to the first limb (38) and secondly to the second limb (40).

* * * * *